(12) United States Patent
Wall et al.

(10) Patent No.: US 10,012,279 B2
(45) Date of Patent: Jul. 3, 2018

(54) BRAKING SYSTEMS INCORPORATING WEAR AND CORROSION RESISTANT ROTORS

(71) Applicant: Tech M3, Inc.

(72) Inventors: Doug Wall, Poway, CA (US); Nathan K. Meckel, Ramona, CA (US)

(73) Assignee: Tech M3, Inc.

( * ) Notice: Subject to any disclaimer, the term of this patent is extended or adjusted under 35 U.S.C. 154(b) by 0 days.

(21) Appl. No.: 14/359,295

(22) PCT Filed: Mar. 15, 2014

(86) PCT No.: PCT/US2014/029955
§ 371 (c)(1),
(2) Date: May 19, 2014

(87) PCT Pub. No.: WO2014/145231
PCT Pub. Date: Sep. 18, 2014

(65) Prior Publication Data
US 2015/0369315 A1 Dec. 24, 2015

Related U.S. Application Data (60) Provisional application No. 61/802,308, filed on Mar. 15, 2013.

(51) Int. Cl.
*F16D 65/12* (2006.01)
*F16D 55/225* (2006.01)
*F16D 69/00* (2006.01)

(52) U.S. Cl.
CPC ......... *F16D 65/127* (2013.01); *F16D 55/225* (2013.01); *F16D 65/12* (2013.01);
(Continued)

(58) Field of Classification Search
CPC ...... F16D 65/127; F16D 55/225; F16D 65/12; F16D 2069/004; F16D 2250/0046; F16D 2069/005
(Continued)

(56) References Cited

U.S. PATENT DOCUMENTS 2,753,808 A    7/1956  Kluge
3,171,527 A    3/1965  Ott
(Continued)

FOREIGN PATENT DOCUMENTS

DE           538507 C      11/1931
DE    102004016092 A1      10/2005
(Continued)

OTHER PUBLICATIONS

Tritt, Terry M.' "Thermal Conductivity: Theory, Properties and Applications", p. 100, 2004 Kluwer Academic / Plenum Publishers.
(Continued)

*Primary Examiner* — Melanie Torres Williams
(74) *Attorney, Agent, or Firm* — Mintz Levin Cohn Ferris Glovsky and Popeo, P.C.; James P. Cleary, Esq.

(57) ABSTRACT

In some implementations of the current subject matter, a braking system can include a first combination of braking components operable to slow or stop rotational motion of a first wheel of the multi-wheeled vehicle and a second combination of braking components operable to slow or stop rotational motion of a second wheel of the multi-wheeled vehicle. The first combination can include a first brake rotor and a first brake pad, and the first brake rotor can include a coating that imparts wear and corrosion resistant properties to the first brake rotor. The second combination can include a second brake rotor and a second brake pad, and the second brake rotor can lack the coating. Related systems, methods, articles of manufacture, and the like are disclosed.

17 Claims, 5 Drawing Sheets

(52) U.S. Cl.
CPC .............. *F16D 2069/004* (2013.01); *F16D 2250/0046* (2013.01); *Y10T 29/49828* (2015.01)

(58) Field of Classification Search
USPC .................. 188/218 XL, 17, 18 R, 18 A
See application file for complete search history.

(56) References Cited

U.S. PATENT DOCUMENTS

| | | | |
|---|---|---|---|
| 3,314,509 A | 4/1967 | Pelikan | |
| 3,443,454 A | 5/1969 | Hall | |
| 3,899,054 A | 8/1975 | Huntress et al. | |
| 3,993,415 A | 11/1976 | Hauser | |
| 4,180,622 A | 12/1979 | Burkhard et al. | |
| 4,290,510 A | 9/1981 | Warren | |
| 4,555,239 A | 11/1985 | Miranti, Jr. | |
| 4,808,275 A | 2/1989 | Ohzora et al. | |
| 4,933,300 A | 6/1990 | Koinuma et al. | |
| 5,116,691 A | 5/1992 | Darolia et al. | |
| 5,306,407 A | 4/1994 | Hauzer et al. | |
| 5,407,035 A | 4/1995 | Cole et al. | |
| 5,501,306 A | 3/1996 | Martino | |
| 5,535,857 A | 7/1996 | Barlow | |
| 5,558,186 A | 9/1996 | Hyde et al. | |
| 5,709,288 A | 1/1998 | Riebe | |
| 5,725,913 A | 3/1998 | Wong et al. | |
| 5,838,522 A | 11/1998 | Komvopoulos et al. | |
| 5,861,203 A | 1/1999 | Yuan et al. | |
| 5,884,388 A | 3/1999 | Patrick et al. | |
| 5,901,818 A | 5/1999 | Martino | |
| 5,922,452 A | 7/1999 | Takahashi et al. | |
| 5,928,771 A | 7/1999 | DeWald, Jr. et al. | |
| 6,119,828 A | 9/2000 | Parsons | |
| 6,196,936 B1 | 3/2001 | Meckel | |
| 6,302,246 B1 | 10/2001 | Naumann et al. | |
| 6,457,566 B1 | 10/2002 | Toby | |
| 6,514,592 B1 | 2/2003 | Hubbard et al. | |
| 6,527,092 B2 | 3/2003 | Gruber et al. | |
| 6,536,564 B1 | 3/2003 | Garfinkel et al. | |
| 6,585,089 B1* | 7/2003 | Parker .................. | F16D 65/092 188/218 XL |
| 6,612,415 B2 | 9/2003 | Yamane | |
| 6,857,509 B1 | 2/2005 | Braiato et al. | |
| 6,935,470 B1 | 8/2005 | Smith, Jr. | |
| 7,097,922 B2 | 8/2006 | Shen et al. | |
| 7,246,586 B2 | 7/2007 | Hosenfeldt et al. | |
| 7,261,192 B2 | 8/2007 | Khambekar et al. | |
| 7,799,420 B2 | 9/2010 | Beck et al. | |
| 8,084,089 B2 | 12/2011 | Meckel | |
| 8,449,943 B2 | 5/2013 | Meckel | |
| 8,893,863 B2 | 11/2014 | Meckel | |
| 9,394,955 B2 | 7/2016 | Huschenhoefer et al. | |
| 9,618,066 B2 | 4/2017 | Schoepf et al. | |
| 9,638,276 B2 | 5/2017 | Schluck et al. | |
| 9,653,978 B2 | 5/2017 | Zernikow et al. | |
| 2002/0117360 A1 | 8/2002 | Toby | |
| 2002/0153213 A1 | 10/2002 | Gruber et al. | |
| 2003/0136614 A1 | 7/2003 | Feldmann et al. | |
| 2003/0145447 A1* | 8/2003 | Moseley .................. | C04B 35/83 29/458 |
| 2003/0183306 A1 | 10/2003 | Hehmann et al. | |
| 2004/0129314 A1 | 7/2004 | Welty et al. | |
| 2004/0178029 A1 | 9/2004 | Hoyte et al. | |
| 2005/0056495 A1 | 3/2005 | Greppi | |
| 2005/0087406 A1 | 4/2005 | Meckel | |
| 2005/0183909 A1 | 8/2005 | Rau et al. | |
| 2005/0252739 A1 | 11/2005 | Callahan et al. | |
| 2006/0078749 A1 | 4/2006 | Grau et al. | |
| 2006/0175160 A1 | 8/2006 | Weiss | |
| 2007/0234929 A1 | 10/2007 | Reinsch et al. | |
| 2007/0286961 A1 | 12/2007 | Pahle et al. | |
| 2008/0041675 A1 | 2/2008 | Baumgartner et al. | |
| 2008/0196985 A1 | 8/2008 | Meckel | |
| 2008/0196986 A1 | 8/2008 | Meckel | |
| 2008/0213610 A1 | 9/2008 | Idei et al. | |
| 2009/0026025 A1 | 1/2009 | Hampton | |
| 2009/0026026 A1 | 1/2009 | Martino | |
| 2009/0050423 A1 | 2/2009 | Meckel | |
| 2009/0288921 A1* | 11/2009 | Meckel .................. | F16D 65/12 188/73.1 |
| 2011/0048871 A1* | 3/2011 | Meckel .................. | F16D 65/12 188/71.6 |
| 2011/0135948 A1 | 6/2011 | Pyzik et al. | |
| 2012/0037465 A1 | 2/2012 | Abe et al. | |
| 2012/0118686 A1 | 5/2012 | Meckel | |
| 2013/0161136 A1 | 6/2013 | Huschenhoefer et al. | |
| 2013/0161137 A1* | 6/2013 | Huschenhoefer ....... | F16D 65/12 188/218 XL |
| 2013/0220745 A1 | 8/2013 | Meckel | |
| 2014/0332330 A1 | 11/2014 | Orr et al. | |
| 2015/0041262 A1 | 2/2015 | Meckel | |
| 2015/0369314 A1 | 12/2015 | Filip et al. | |
| 2015/0369315 A1 | 12/2015 | Wall et al. | |

FOREIGN PATENT DOCUMENTS

| | | |
|---|---|---|
| DE | 10 2011 122308 A1 | 6/2012 |
| EP | 1256739 A2 | 11/2002 |
| EP | 1258647 B1 | 2/2012 |
| EP | 2707621 B1 | 7/2016 |
| FR | 788671 A | 10/1935 |
| FR | 2807484 A1 | 10/2001 |
| GB | 2 154 614 A | 9/1985 |
| JP | 63-026210 A | 2/1988 |
| JP | 02-175859 A | 7/1990 |
| JP | 04312220 A | 11/1992 |
| JP | 04337126 A | 11/1992 |
| JP | 04337127 A | 11/1992 |
| JP | 07-208520 A | 8/1995 |
| JP | 07-224390 A | 8/1995 |
| JP | 09-118755 A | 5/1997 |
| JP | 2003-049252 A | 2/2003 |
| JP | 2004-316850 A | 11/2004 |
| KR | 10-1998-049479 A | 9/1998 |
| KR | 10-1999-0036405 | 5/1999 |
| KR | 10-2006-0051087 A | 5/2006 |
| KR | 20100098817 A * | 9/2010 |
| WO | WO-97/38235 A1 | 10/1997 |
| WO | WO-98/50837 A1 | 11/1998 |
| WO | WO-2006/092270 A1 | 9/2006 |

OTHER PUBLICATIONS

Yu et al. "Vapor deposition of platinum alloyed nickel aluminide coatings." Surface & Coatings Technology 201. (Jun. 2006) pp. 2326-2334.

* cited by examiner

BRAKING SYSTEMS INCORPORATING WEAR AND CORROSION RESISTANT ROTORS

CROSS-REFERENCE TO RELATED APPLICATION

This application claims priority to U.S. Provisional Application No. 61/802,308, filed on Mar. 15, 2013, the disclosure of which is incorporated by reference herein.

TECHNICAL FIELD

The subject matter described herein relates to braking systems and more particularly to a system and method for equipping a vehicle with braking systems.

BACKGROUND

A vehicle braking system for use on a wheeled vehicle generally includes a rotating device that rotates with a wheel while the vehicle is in motion and a friction device that is mounted to an apparatus on the vehicle body itself. When the brakes are applied, the apparatus moves the friction device into contact with a surface or surfaces on the rotating device to create friction between the rotating device and the friction device. The resulting friction causes the speed of the vehicle to decrease. In a vehicle with a disk braking system, the rotating device is commonly referred to as a brake disk or a brake rotor while the friction device is commonly referred to as a brake pad. In a vehicle with drum brakes, the rotating device is commonly referred to as a drum while the friction device is commonly referred to as a brake shoe. The terms "brake rotor" and "brake pad" are used throughout this disclosure to refer generically and respectively to a rotating device of a braking system and a friction device of a braking system. A braking system can include one or more components operable to more a friction material on the brake pad to forcibly contact with a friction surface of the brake rotor. The braking system can be controlled by a user operable mechanism, such as a foot-operated brake pedal or a hand-operated grip device and can be mechanical, electrical, hydraulic, or the like For braking systems featuring a brake rotor or a disk, the mechanism can be a set of calipers and a mechanical, electrical, hydraulic, etc. system for applying pressure to one or more brake pads mounted to each caliper to urge it/them against the friction surfaces of the brake rotor. The brake rotor typically has two opposing friction surfaces on opposite annular faces of a disk-like structure. In brake drum systems, the friction surface of the drum is typically on the inner rotation surface. The brake shoes are urged against the friction surface by calipers, levers, or other devices that are controlled by the user.

SUMMARY

In one aspect, a braking system of a multi-wheeled vehicle includes a first combination of braking components operable to slow or stop rotational motion of a first wheel of the multi-wheeled vehicle, and a second combination of braking components operable to slow or stop rotational motion of a second wheel of the multi-wheeled vehicle. The first combination includes a rotor having a coating that imparts wear and corrosion resistant properties to the first brake rotor a first brake rotor and a first brake pad. The second combination includes a second brake rotor that lacks the coating and a second brake pad.

In an interrelated aspect, a method for configuring a braking system of a multi-wheeled vehicle includes installing a first combination of braking components operable to slow or stop rotational motion of a first wheel of the multi-wheeled vehicle and installing a second combination of braking components operable to slow or stop rotational motion of a second wheel of the multi-wheeled vehicle. The first combination includes a rotor having a coating that imparts wear and corrosion resistant properties to the first brake rotor a first brake rotor and a first brake pad. The second combination includes a second brake rotor that lacks the coating and a second brake pad.

In another interrelated aspect, a method for slowing or stopping a multi-wheeled vehicle includes engaging a braking system of the multi-wheeled vehicle that includes a first combination of braking components operable to slow or stop rotational motion of a first wheel of the multi-wheeled vehicle and a second combination of braking components operable to slow or stop rotational motion of a second wheel of the multi-wheeled vehicle. The first combination includes a rotor having a coating that imparts wear and corrosion resistant properties to the first brake rotor a first brake rotor and a first brake pad. The second combination includes a second brake rotor that lacks the coating and a second brake pad.

In some variations of these aspects, one or more of the following features can optionally be included in any feasible combination. The coating can include graphene. The coating can alternatively or in addition include a first layer comprising a first material and a second layer comprising a second material. The first material can include a metal. The metal can include at least one of titanium, chromium, zirconium, aluminum, and hafnium. The first layer can include a plurality of layers of the first material merged to form a single layer. The second material can include at least one of a nitride, a boride, a carbide, or an oxide of the first material. The coating can include multiple iterations of the first layer and the second layer. The multiple iterations of the first layer can be deposited sequentially prior to deposition of the multiple iterations of the second layer, or the multiple iterations of the first layer can be deposited alternatively with intervening deposition of one or more of the multiple iterations of the second layer. Each of the multiple iterations of the first layer and each of the multiple iterations of the second layer can have a thickness in a range of one atom to three or four thousand Angstroms. The first brake rotor can include a first scale of surface topography that can include a plurality of island formations separated by channels. The first brake rotor can include a second scale of surface topography that can include a plurality peaks and valleys of regular or irregular shape.

Some of a friction material of the first brake pad can be transferred to a friction surface of the brake rotor during braking such that a transfer film layer including the transferred friction material is created and mechanically held in place on the friction surface of the brake rotor by features of the first and/or second scale of surface topography. The friction material of the brake pad and the friction material of the transfer film layer can participate in an adherent friction interaction that enhances a first braking power of the first combination of braking components relative to a second braking power of the second combination of braking components. A friction material of the first brake pad can consist essentially of components other than copper. A friction material of the first brake pad can include an environmentally beneficial component.

The details of one or more variations of the subject matter described herein are set forth in the accompanying drawings and the description below. Other features and advantages of the subject matter described herein will be apparent from the description and drawings, and from the claims. This summary is not intended to be limiting. Rather the claims that eventually issue in this application are to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Brake rotors are generally made of a durable material while brake pads are made of a material that wears away under the friction resulting from stopping or slowing a vehicle. However, brake rotors typically also experience wear and eventually require replacement, or on rare occasions re-machining is allowed, which can be expensive. Additionally, particulate debris from brake pads generated during braking is typically released to the environment. Because of the chemical compositions typically employed in brake pads, this particulate debris can include constituents, including but not limited to copper, cadmium, lead, mercury, and the like, that are known or suspected to have harmful effects when found in significant quantities in the environment. In addition, as a brake pad gets hot it can and commonly does form toxic gases and elements. A braking system that results in slower wear of both the brake rotor and the brake pad is therefore desirable. Further, a brake pad formed of a particular composition can both be made with organic materials to reduce or possibly eliminate the harmful or toxic materials of conventional brake pads, and are formulated specifically to optimize operation with the coated brake rotor.

To address these and potentially other needs, implementations of the current subject matter provide methods, systems, articles or manufacture, and the like that can, among other possible advantages, provide a brake rotor having surface roughness and hardness characteristics that maximize a useful lifetime of the brake rotor while minimizing abrasive consumption of the friction material on a brake pad used in conjunction with the brake rotor. Implementations of the current subject matter further provide methods, systems, articles or manufacture, and the like, of a brake pad composition to optimize performance and minimize wear and release of harmful or toxic substances or matter.

Figure 1:
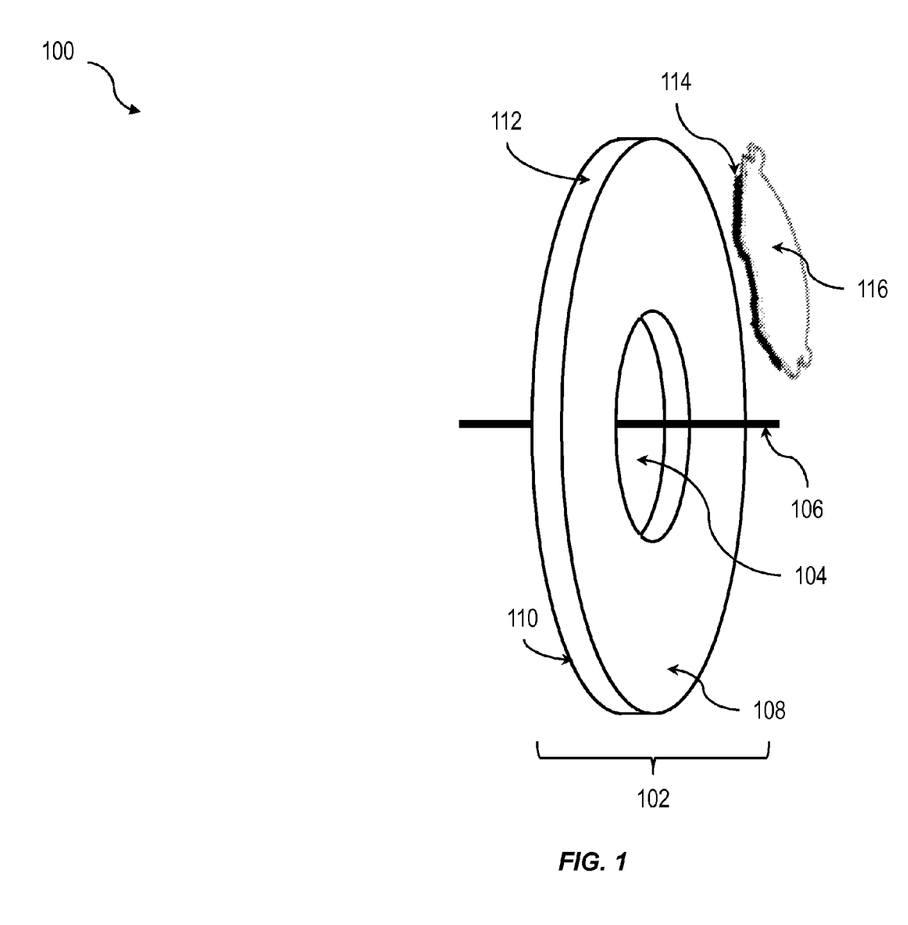
FIG. 1 shows a perspective diagram illustrating features of a braking system.

As shown in the example of a braking system 100 in FIG. 1 a brake rotor 102 can, in some examples, have a disk-shaped body with a central hole 104 adapted so that the brake rotor 102 can be positioned over the hub of a wheel (not shown) and centered on the axis of rotation 106 of the wheel and the brake rotor 102. The shape of the brake rotor 102 and the central hole 104 are shown in FIG. 1 as having a circular cross-section normal to the axis of rotation 106. However, this is merely an example. The cross-section of either or both of the brake rotor 102 and the central hole 104 can be non-circular as long as they are rotationally symmetrical about the axis of rotation 106. Opposing annular surfaces 108 and 110 are disposed on opposite sides of the brake rotor 102 and can extend from the outer periphery 112 of the brake rotor 102 to the central hole 104. At least a portion of each of the annular surfaces 108 and 110 serves as a friction surface against which the friction material 114 of one or more brake pad(s) 116 is urged during braking. A corrosion resistant coating can be applied to at least part of the friction surfaces on the two opposing annular surfaces 108 and 110 as described below as well as in one or more of co-pending and co-owned U.S. patent application publications 2008-0196985 A1, 2008/0196986A1, 2009/0050423A1, and 2009/0288921A1 and co-pending and co-owned U.S. patent application Ser. No. 12/848,429, the disclosures of which are hereby incorporated by reference in their entireties.

Figure 2:
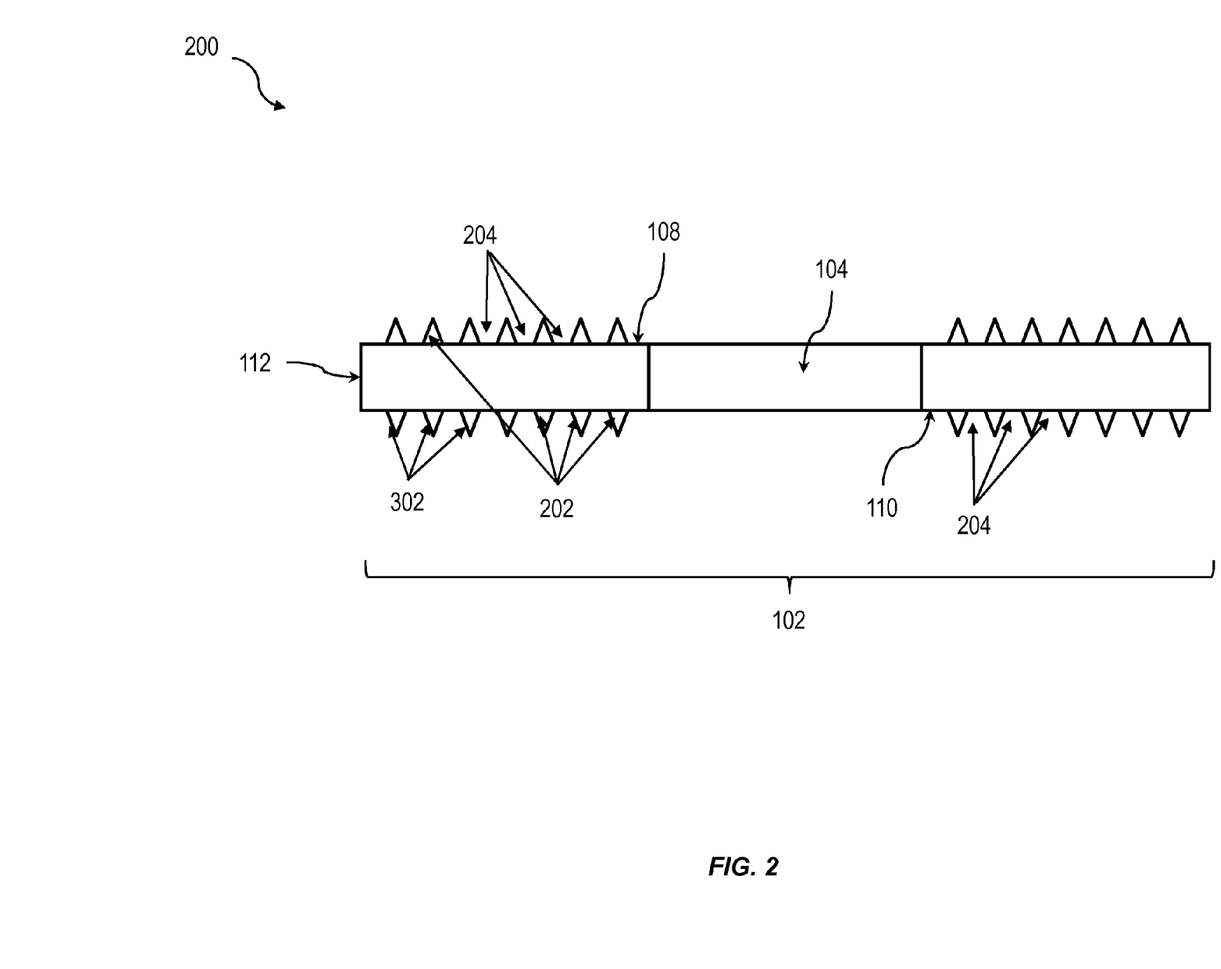
FIG. 2 shows a diagram showing a cross-sectional view of a brake rotor having surface roughness features.

As shown in the cross-sectional diagram 200 of a brake rotor 102 in FIG. 2, the friction surfaces disposed on the opposing annular surfaces 108 and 110 of the brake rotor 102 can in some implementations include surface roughness features that can take the form of a plurality of raised "peaks" or island formations 202 with spaced "valleys" or air flow channels 204 between the island formations peaks. Only the peaks 202 generally contact the friction material 114 of the brake pad 116 during engagement of the braking system 100. A uniform pattern can be used throughout the friction surface of an annular surface 108 or 110 of a brake rotor 102. Alternatively or in addition, a combination of different shaped surface features can be included to present a visible design or texture that can vary in a random or predetermined manner across either or both annular surfaces 108, 110. The peaks 202 can include tear drop shaped formations, circle or dot shaped formations, figure eight shaped formations, letter shaped formations, and the like, with valleys 204 between and/or around the peaks 202.

The peaks 202 can have sharp, angular cross-sectional shapes as illustrated in FIG. 2. Other shapes of the peaks 202 and valleys 204 are also within the scope of this disclosure. Shapes of the peaks 202 can include, but are not limited to squares, trapezoids, rectangles, triangles, stars, letters or names, numbers, logos, trademarks, dashes, other geometric shapes, and the like, with or without rounded corners. The shape and positioning of the peaks 202 can be designed to be aesthetically pleasing in appearance, which is particularly desirable when the annular surfaces 108 and 110 are externally visible, as is the case with many motor cycle brake rotors. The valleys 204 adjacent to an/or surrounding the peaks 202 can result in a significant reduction in the overall weight of the brake rotor 102 which in turn can improve the efficiency and performance of the motor vehicle. Additionally, the valleys 204 can allow for air flow around the peaks 202 for increased cooling and heat dissipation. The base of each valley 204 can optionally be roughened or modulated to provide bumps or the like that create turbulence in air flow along the valley 204 which can also improve the cooling effect.

Peaks 202 of desired shapes and dimensions can be formed in any suitable manner, for example by appropriate machining or other forming processes. After forming peaks 202, valleys 204, and/or other surface roughness features on one or both annular surfaces 108, 110 of the brake rotor 102, the annular surface 108, 110 of the brake rotor 102 can be coated with a wear and corrosion resistant coating that eliminates or greatly reduces the rate at which the peaks 202 are worn down by contact with the friction material 114 of a brake pad. The wear and corrosion resistant coating can be deposited on the surfaces of the peaks 202 and also optionally in the valleys 204. The wear and corrosion resistant coating can improve the overall look or aesthetics of the brake rotor 102 while also substantially increasing its hardness relative to an uncoated brake rotor friction surface.

During braking action, some amount of the friction material 114 of a brake pad 116 is transferred to the friction surface of the brake rotor 102. This generally occurs during a "seating" or "break-in" process persisting for some period of time and/or miles driven after new brake pads 116 are installed on a vehicle. With a conventional brake rotor, even one initially manufactured with surface roughness features, the friction forces and stresses placed on the friction surfaces during normal braking operations typically rapidly lead to a flattening of the friction surface. Thus, any advantages that might have been gained from the surface roughness features (e.g. better cooling air flow, decorative patterns, etc.) are highly transient and unlikely to be relevant for the majority of the useful lifetime of the brake rotor.

According to implementations of the current subject matter, a wear and corrosion resistant coating can be applied to a brake rotor 102 that has been pre-treated to create a surface roughness condition on at least part of the friction surfaces of the brake rotor 102. In one implementation, the wear and corrosion resistant coating can include a first layer of a metal, such as pure titanium metal, and a second layer that can include a nitride, a boride, an oxide, a carbide, etc. of the metal used in the first layer. The coating can be applied using a physical vapor deposition source, such as for example a cathodic arc source with a controlled gas atmosphere. As an illustrative example, the first, metal layer, which can include amorphous or crystalline metal, can be deposited by vapor deposition in an inert atmosphere. The second layer can be formed by vapor deposition under an atmosphere containing a reactive gas, such as for example nitrogen, boron, oxygen, one or more hydrocarbons or carbon monoxide or dioxide, and the like. The wear corrosion resistant coating can advantageously have a Rockwell C hardness of 40±2 to as much as 46±2, which can result in a much longer persistence of the surface roughness features on the friction surfaces of the brake rotor 102.

This first layer can be applied directly onto a prepared braking surface, which can include a surface finish produced on the annular surfaces 108 and 110 of the brake rotor 102 substrate, optionally including the peaks 202. In one example, a surface finish can be formed by blasting all or part of the annular surfaces 108 and 110 with a continuous stream of particles (commonly referred to as bead blasting) which are typically harder than the annular surfaces 108 and 110. These particles can be round and/or smooth in shape or alternatively very irregular in shape. Various particle shapes can be used to impart a different surface finish or surface geography to the brake rotor 102. For example, with round particles (of various sizes) and appropriate particle energy (air pressure or hydro pressure) a surface texture that microscopically resembles low soft rolling hills can be achieved. With irregular (crystalline) shaped particles, a very coarse surface geometry (very rugged/jagged peaks and valleys) can be imparted to the brake disk or rotor 100 surfaces. Other methods such as a sanded or a ground surface finish can be used to give a different appearance when coated with the wear and corrosion resistant coating. When the sanded or ground surface finish is done in a cross-hatched configuration and then coated with the wear and corrosion resistant coating, the coated brake rotor 102 can be made to look as though it has a woven appearance such as is found in components made from carbon fiber.

As noted above, the amorphous or crystalline material can in some implementations be a metal such as titanium, chromium, zirconium, aluminum, hafnium or an alloy thereof. The wear and corrosion resistant coating can further include a second layer that overlays and contacts the first layer. The first layer and the second layer can be distinct or can alternatively intermingle or merge or diffuse into each other such that no distinct boundary exists between them. The second layer can in some variations include one or more binary metals, for example, one or more metal nitrides, metal borides, metal carbides and metal oxides. The second layer can alternatively or additionally include one or more nitrides, borides, carbides or oxides of the metal used in the first layer. In some implementations, the wear and corrosion resistant coating can include more than two layers of alternating metal and metal compound materials that are applied in order to impart specific physical properties to the brake disk or rotor 102. In some implementations of a wear and corrosion resistant coating, the first layer can include amorphous titanium and the second layer can include a titanium nitride (generically, $TiN_x$). Multiple alternating instances of the first layer and the second layer can be configured to form a lattice structure or a super lattice structure that includes thin films formed by alternately depositing two different components to form layered structures. Multilayers can become super-lattices when the period of the different layers is less than about 10 nm (100 Angstroms). With this cooperation of structure, a wear and corrosion resistant coating having a service life to exceed approximately 100,000 vehicle miles or more can be obtained. It should be noted that abbreviations are used herein as a shorthand rather than an exact chemical label, and do not suggest that the stoichiometry of the indicated compound must be exactly as stated in the abbreviation.

The wear and corrosion resistant coating can cause surface roughness features (e.g. either or both of the first or second scales of surface topography discussed below) on the annular surfaces 108, 110 of the brake rotor 102 to be significantly more durable to wear from normal braking activities. As such, the peak 202 and valley 204 topography and/or an island formation and channel topography (discussed below) that is originally present on the friction surfaces of the brake rotor 102 can persist for a large percentage of the useful life of the brake rotor 102, which can in some implementations be many multiples of a typical useful lifetime for a conventional brake rotor without a wear and corrosion resistant coating as described herein.

Surface roughness features on the friction surface of a brake rotor 102 can interact during application of the friction material 114 of the brake pad 116 to the friction surface during braking system operation to cause the surface roughness features of the friction surface to accumulate a layer of transferred friction material 114 from the brake pad 116 to the friction surface. This accumulated layer of friction material on the brake rotor 102 friction surface can experience enhanced friction properties via an adherent friction interaction with the friction material 114 remaining on the brake pad 116. For example, adhesion between the friction material 114 remaining on the brake pad 116 and that transferred to the brake rotor 102 can be more pronounced than adhesion between the friction material 114 on the brake pad 116 and a clean surface of the brake rotor 102. The accumulated layer of friction material transferred to the friction surface of the brake rotor 102 can be successively refreshed by transfer of additional amounts of friction material 114 from the brake pad 116 to the brake rotor 102. The accumulated layer can also serve to protect the underlying surface roughness features on the friction surface of the brake rotor 102 from excessive wear. The adherent friction interaction between friction material 114 remaining on the brake pad 116 and friction material transferred to the friction surface(s) of the brake rotor 102 can enhance the normal abrasive fiction interaction between the friction material 114 of the brake pad and the uncoated friction surface of the brake rotor 102.

Figure 3:
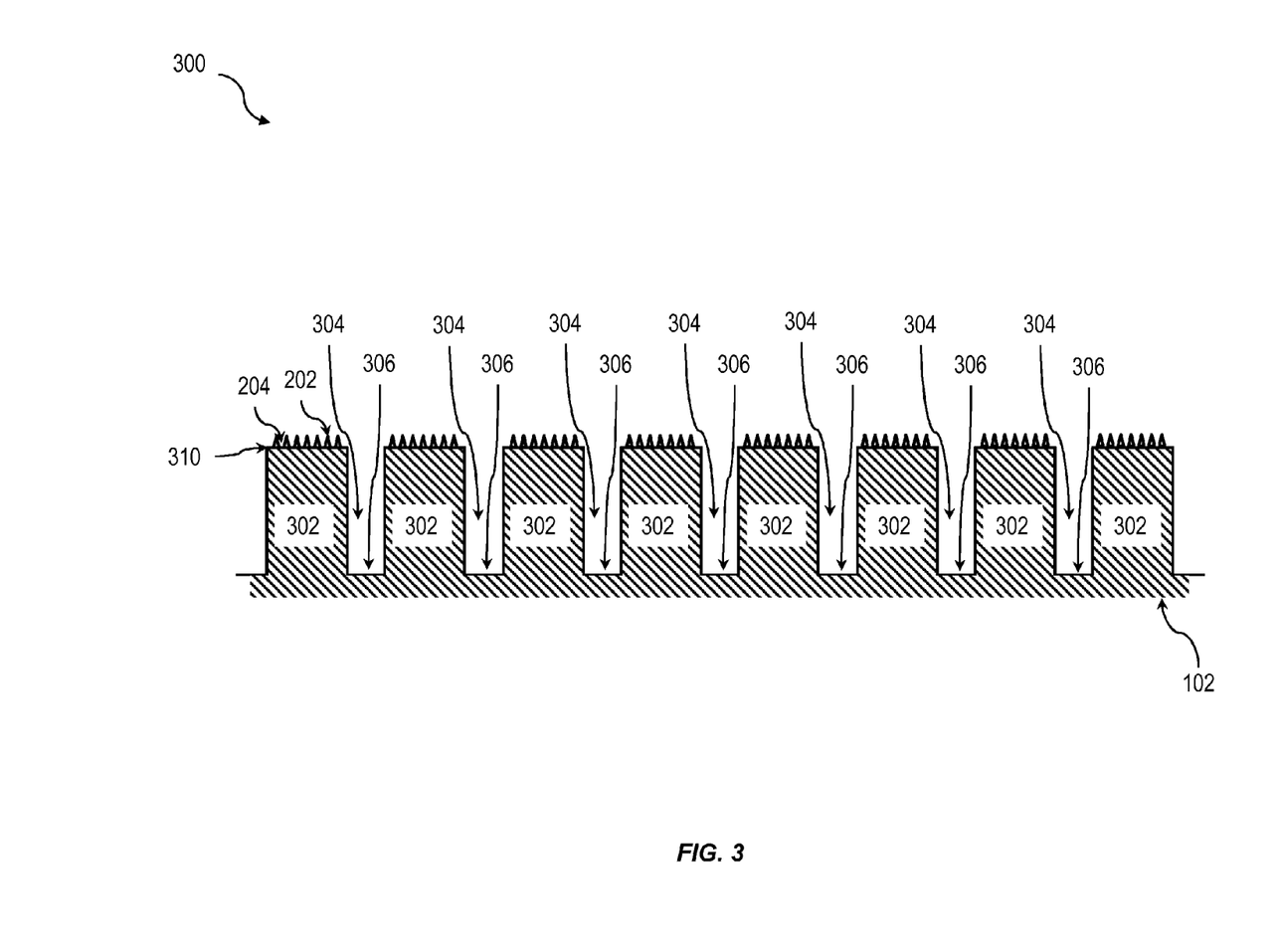
FIG. 3 shows a diagram illustrating a cross-sectional, magnified view of a brake rotor having two scales of surface topography.

In further implementations of the current subject matter, surface topography on a brake rotor surface 108, 110 can exist at two different scales as illustrated in the expanded diagram 300 of part of a brake rotor 102 shown in of FIG. 3. At a first, larger scale, multiple island formations 302 can be included on a friction surface. These multiple island formations can form a regular or irregular pattern in which islands are separated by channels 304, which can optionally have base surfaces 306 that are roughened.

In some examples, at least part of the base surfaces 306 of the inter-island channels 304 can have a surface roughness sufficient to create turbulence to air masses flowing in a direction parallel to a plane defined by the annular surface (e.g. a surface orthogonal to an axis about which the brake rotor 102 rotates) for example as the brake rotor 102 rotates with a wheel of a motor vehicle. It will be understood that cross-sectional shapes of the island formations 302 can be substantially rectangular (e.g. as shown in FIG. 3) or any other regular or irregular shape. For example, the island formations can have substantially triangular, substantially trapezoidal, substantially circular, substantially curved, or any other regular or irregular cross-sectional shape as viewed in a plane perpendicular to an annular surface 108, 110 of a brake rotor 102. Various shapes of the island formations 302 as viewed in other planes are also within the scope of the current subject matter. For example, the island formations 302 can have substantially circular, substantially square, substantially rectangular, substantially tear drop shaped, substantially curved, or any other regular or irregular shape as viewed in a plane parallel to an annular surface 108, 110 of a brake rotor 102.

A second, smaller scale of surface topography on a brake rotor surface 108, 110 can include peaks 202 and valleys 204 similar to those described above in reference to FIG. 2. Such peaks and valleys or other "surface roughness" features can be created on upper surfaces 310 of the island formations 302.

Consistent with some implementations of the current subject matter, the first scale of surface topography can be advantageous in reducing an overall weight of a brake rotor 102 and can also provide cooling benefits by permitting an optionally turbulent flow of air along the base surfaces 306 of the channels 304 formed or defined between the island formations 302.

In alternative implementations of the current subject matter, the coating can include graphene, which is a 2-dimensional, crystalline allotrope of carbon in which carbon atoms are densely packed in a regular $sp^2$-bonded atomic scale "chicken wire" (e.g. hexagonal) structure. Graphene can be described as a one-atom thick layer of graphite. It is the basic structural element of other allotropes, including graphite, charcoal, carbon nanotubes, and fullerenes. It can also be considered as an indefinitely large aromatic molecule, the limiting case of the family of flat polycyclic aromatic hydrocarbons. High-quality graphene is strong, light, nearly transparent and an excellent conductor of heat and electricity. Its interactions with other materials and with light and its inherently two-dimensional nature produce unique properties, such as the bipolar transistor effect, ballistic transport of charges, and large quantum oscillations. Addition of graphene to a brake rotor 102 consistent with implementations of the current subject matter can provide one or more potential advantages, potentially including but not limited to improved durability, cooling, corrosion resistance, or the like.

Coatings described herein can advantageously be applied such that existing surface topography features (e.g. the first or second scale of surface topography discussed herein) persist after addition of the coating. In other words, the coating is not so thick as to smooth out either or both of the first scale of surface topography or the second layer of surface topography, assuming that at least one such set of surface topography features are present on the friction surface of the brake rotor 102 prior to addition of the coating.

The hardness of the coating on the friction surfaces of a brake rotor 102 can dictate how persistent the surface roughness condition of the friction surfaces is over repeated braking events. A typical, uncoated brake rotor constructed of cast iron, stainless steel, light weight metal alloys, ceramic materials, ceramic composite materials, titanium, etc. and/or combinations thereof generally has a hardness as measured on the Rockwell "C" scale of about 35±4. The surface roughness features of the friction surfaces of a brake rotor 102 according to implementations of the current subject matter can be characterized by an average amplitude between the peaks 202 and valleys 204, which can in some implementations be in a range of 26-32 micro-inches According to implementations of the current subject matter, an optimized relationship between the surface roughness and the surface hardness can be obtained to maximize persistence of the peak 202 and valley 204 surface roughness features and/or the island formation 302 and channel 304 features over a useful lifetime of a brake rotor 102. The optimal relationship between the surface roughness and surface hardness is one at which the peak and valley topography and/or island formation and channel topography is maintained to allow continued transfer and retention of friction material from a brake pad 116 to a friction surface of the brake rotor 102 such that adherent friction between the transferred friction material and the friction material 114 remaining on the brake pad 116 adds to abrasive friction forces between the brake rotor itself and the friction material 114 of the brake pad to improve the stopping power of a braking system 100.

Excessive hardness may lead to brittleness, while too little hardness may lead to premature wear of the surface roughness features. Also, excessive surface roughness may lead to too rapid a consumption of the friction material 114 on a brake pad 116 as too much of the friction material is transferred to and potentially scaled away from the friction surface of the brake rotor. Too little surface roughness on the brake rotor 102 may lead to too little transfer of friction material and/or too little retention of the transferred friction material on the friction surfaces of the brake rotor 102, thereby weakening the braking power and potentially requiring greater reliance on abrasive friction, which can lead to increased wear.

An additional variable in the analysis of an optimal surface roughness and surface hardness regime can be the composition and other physical properties of the friction material of a brake pad. For example, a brake pad with a friction material that is readily transferable and/or adherable to a friction surface of a brake rotor may require a less pronounced surface roughness to create the advantages disclosed herein for the inventive subject matter. In such an example, a relatively lower surface roughness may be used in conjunction with an increased surface hardness as the lower amplitude between the peaks 202 and valleys 204 of the surface topography of the brake rotor 102 can be less prone to damage due to the increased brittleness that can accompany increased surface hardness.

The second scale of surface topography can advantageously assist in retaining a transferred film or layer of brake pad material to surfaces of the brake rotor 102. In the example of FIG. 3, the upper surfaces 310 of the island formations 302 can form the friction surface of the brake rotor 102. The surface roughness at the second scale of surface topography (e.g. the peaks 202 and valleys 204) can act as an abrasive surface that effective scrapes some of the friction material 114 from the brake pad 116 and then retains this friction material in a transfer film layer on the friction surfaces of the brake rotor 102. This transfer film layer can be retained on the friction surface of the brake rotor 102 at least in part as a result of the second scale of surface topography, whose peaks 202 and valleys 204 can provide a structure that resists easy wiping off or other dislodging actions that might free the transfer film layer from a brake rotor 102 that lacks such features.

The transfer film layer can provide significant benefits in both durability and braking effectiveness of the braking system 100. For example, the retained transfer film layer of the friction material can protect the underlying material of the brake rotor 102 from abrasive friction interactions with the brake pad 116 and its friction material 114. Instead, the friction material 114 of the brake pad 116 can interact with similar material present in the transfer film layer retained on the brake rotor 102. The presence of similar materials on either side of the brake pad-brake rotor interaction during actuation of a braking system 100 can also provide improvements in braking power. In an example, the friction material 114 of the brake pad 116 and the transfer film layer on the brake rotor can experience a form of adherent friction, in which friction material dynamically transfers in either direction (e.g. back and forth between the brake pad 116 and the transfer film layer on the brake rotor 102), with a breaking and reforming of molecular bonds occurring as part of the process.

While adherent friction may occur to some small extent in previously available brake rotors, the absence of surface topography features (e.g. either or both of the peaks 202 and valleys 204 of the second scale of surface topography and optionally also the island formation 302 and channels 304 of the first scale of surface topography described herein) on the surfaces of conventional rotors can render this effect relatively insignificant. For example, the amount of transferred friction material present per unit area in a transfer film layer occurring on a conventional rotor can be orders of magnitude smaller than that present in a brake rotor 102 having features described herein. Additionally, without a surface topography structure capable of retaining a transfer film layer, the impact of adherent friction can be diminished as the transfer film layer would not be laterally anchored to the friction surface of the brake rotor 102 or otherwise resistant to rotational motion about the friction surface of the brake rotor 102 during actuation of the braking system except by relatively weak van der Waals or electrostatic forces. The first scale of surface topography (e.g. island formations 302 and channels 304) and/or the second scale of surface topography (e.g. peaks 202 and valleys 204) described herein, or functional or structural equivalents thereof, can provide a mechanical anchoring mechanism by which a transfer film layer has increased resistance to rotational forces and/or other forces or effects that might act to dislodge the transfer film layer from the friction surface when the braking system 100 is actuated.

Other potential advantages can result for a brake rotor 102 having one or more scales of surface topography as described herein that are sufficient to generate and retain a transfer film layer that includes friction material from a brake pad 116 acting on the brake rotor 102. For example, the transfer film layer can act as a protective layer that reduces abrasive friction on the friction surface of the brake rotor 102. This protective feature can be beneficial in extending the useful lifetime of a brake rotor 102 as overall wear of the friction surface can be reduced. Adherent friction and/or one or more other mechanisms that improve braking effectiveness of a braking system the includes such a brake rotor 102 and a brake pad 116 with creation of a transfer film layer can also reduce wear of the friction material from the brake pad 116. This effect may also result from the increased importance of adherent friction relative to abrasive friction as well as the possibility that a "stickier" brake rotor 102 to brake pad friction material interaction can require less overall force to be applied during actuation of the braking system. Decreased wear of the friction material of a brake pad 116 can reduce an amount of friction material debris created during actuation of the braking system 100 and released into the environment. As one or more chemical components of brake pad friction material can be damaging to the environment, human health, etc., this effect can has significant advantages, particularly in view of increasing governmental regulation of emission from braking systems.

Each of a first scale of surface topography and a second scale of surface topography on a friction surface of a brake rotor 102 can be created, formed, etc. through one or more processes. For example, a surface finishing process for creating the island formations 302 and channels 304 of a first scale of surface topography can include one or more machining or forming techniques, including but not limited to bead blasting, grinding, acid etching, laser etching, roll forming, embossing, stamping, honing, lapped, polished, blanched, milled, profiled or any other machined surface treatment or surface geometry modification and any combination(s) thereof. A surface finishing process for creating peaks 202 and valleys of a second scale of surface topography can include one or more machining or forming techniques, including but not limited to bead blasting, sanding, grinding, acid etching, photo-resist etching, roll forming, embossing, stamping, honing, lapping, polishing, blanching, milling, profiling, or any other machined surface treatment or surface geometry modification and any combination(s) thereof.

In further implementations, and with reference to FIG. 1 the friction material 114 of one or more brake pad(s) 116 can be formulated to optimize braking performance of the braking system, by optimizing cooperation with the wear and corrosion resistant coated rotors 102 described herein. Such cooperation maximizes braking performance (i.e., lowers braking distance and time, improves surface-to-surface contact, etc.) while minimizing wear and release of harmful or toxic materials into the atmosphere or environment. Table 1 represents a formation of a friction material 114 for a brake pad in accordance with preferred implementations.

TABLE 1

Example fractions of components of brake pad material formulations consistent with implementations of the current subject matter

|    | Constituent    | Formula 1 | Formula 2 |
|----|----------------|-----------|-----------|
| 1  | Fe powder      | 60        | 59        |
| 2  | steel chip     | 7         | 8         |
| 3  | SiC            | 1         | 2         |
| 4  | Ba(SO)4        | 5         | 6         |
| 5  | Iron Sulfide   | 2.5       | 0         |
| 6  | coke           | 9         | 9         |
| 7  | rubber         | 4         | 4         |
| 8  | phenolic resin | 7         | 7         |
| 9  | MgO            | 2         | 1         |
| 10 | sulfur         | 2.5       | 4         |
|    | TOTAL          | 100       | 100       |

The formulations in Table 1 represent an approximate percentage, either by weight, mass, or volume, or a combination thereof. Further, the approximate value for each component material in each formula can vary in some implementations by +/−5%, or +/−10% or more. For example, the percentage of the formula for each component can vary in alternative formulas by +/−50% or more. In some implementations of the current subject matter, a brake pad friction material can advantageously include primarily environmentally inert components. For example, and/or one or more other toxic or otherwise undesirable friction material components can be excluded from the friction material. In other implementations of the current subject matter, one or more beneficial components can be included in the composition of a brake pad friction material, such as for example a material that acts as a fertilizer when deposited on the land surface.

Figure 4:
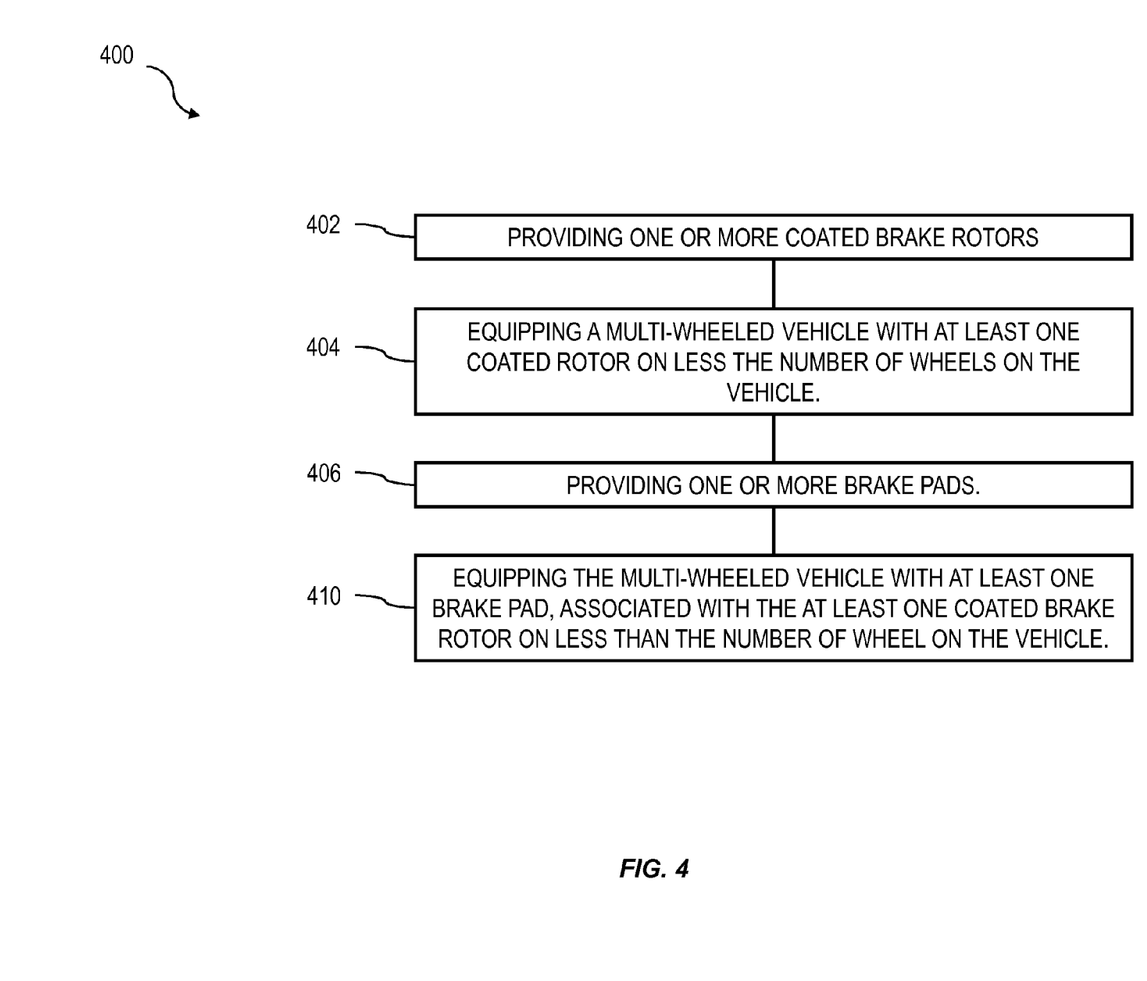
FIG. 4 shows a flow chart illustrating features of a method consistent with implementations of the current subject matter.

In some implementations, a method of equipping a vehicle with braking systems can be configured for maximizing revenue sharing potential, and optimizing a cost/benefit structure of braking system costs to performance. As shown in FIG. 4, a method 400 includes, at 402, providing one or more brake rotors having added durability. The brake rotors can be coated with a wear and corrosion resistant coating as discussed herein. Due to the additional processing, treatment, and materials costs to produce such brake rotors, they may be more expensive than conventional rotors. However, due to their resistance to wear or even improved performance characteristics over time and use, these brake rotors or comparable rotors having increased durability and/or performance can last significantly longer than conventional rotors and need much less replacement.

At 404, a multi-wheeled vehicle is equipped with at least one coated brake rotor. The equipping is on less than the number of wheels of the multi-wheeled vehicle. For instance, a two-wheeled vehicle such as a motorcycle can be equipped with only one coated brake rotor. A two-axle, four-wheeled vehicle such as a car or truck can be equipped such that only one axle, or two wheels, of the vehicle are equipped with the coated brake rotors. In some implementations, the front or forward wheel or wheels are equipped with coated brake rotors. In alternative implementations, rear wheels are equipped. In yet other implementations, a combination of front and rear wheels are equipped with the coated brake rotors, and in such implementations, the coated brake rotors can be rotated with conventional rotors at regular or irregular intervals, which can be based on time, distance traveled, or metered use.

In still yet other implementations, as illustrated at 406 in the method 400, one or more brake pads can be provided. The brake pads are described herein as being formulated to optimize performance with the coated brake rotors, yet minimize wear and release of harmful or toxic compounds, substances or materials. At 408, the multi-wheeled vehicle is equipped with at least one of the brake pads, where the brake pad is preferably matched with one coated brake rotor.

Accordingly, less than all wheels are equipped with a braking system as described herein, saving substantial initial costs, yet not sacrificing too much performance due to the braking system's superior performance, handling and wear compared to conventional braking systems, including conventional braking rotors and conventional brake pads.

In some implementations, a revenue structure can be formulated that allows receipt of payment for an enhanced braking system that is installed on a vehicle on less than all wheels of the vehicle. Thus, the revenue structure can be based on some or all of the benefits experienced by the vehicle had all wheels or axles of the vehicle been equipped with the superior coated rotors and/or brake pads, yet not need to include the costs of such equipping or installation.

Figure 5:
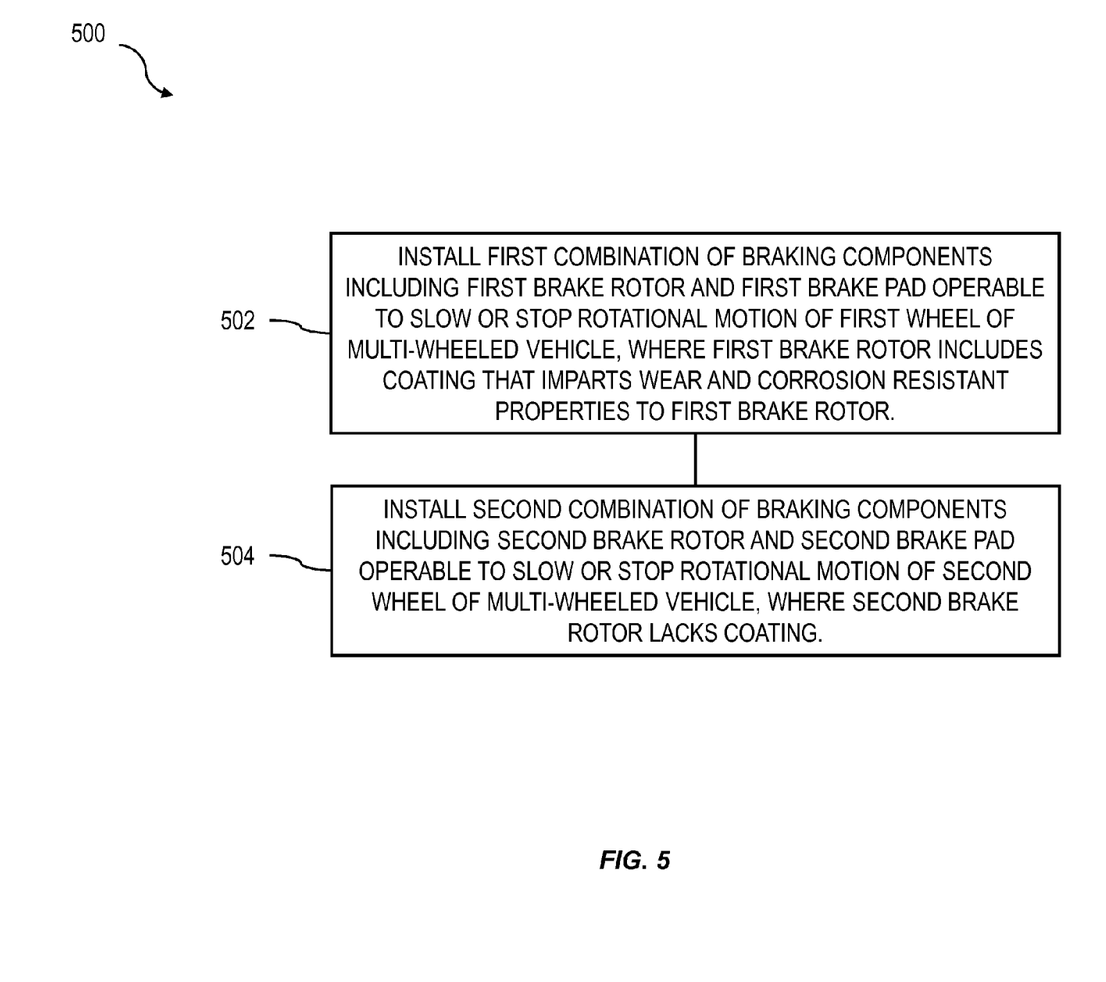
FIG. 5 shows a flow chart illustrating features of another method consistent with implementations of the current subject matter.

In further implementations of the current subject matter illustrated in the process flow chart 500 of FIG. 5, a method for configuring a braking system of a multi-wheeled vehicle, includes installing a first combination of braking components operable to slow or stop rotational motion of a first wheel of the multi-wheeled vehicle at 502 and installing a second combination of braking components operable to slow or stop rotational motion of a second wheel of the multi-wheeled vehicle at 504. The first combination includes a first brake rotor and a first brake pad, and the first brake rotor includes a coating that imparts wear and corrosion resistant properties to the first brake rotor, for example as described elsewhere herein. The second combination includes a second brake rotor and a second brake pad. Unlike the first brake rotor, the second brake rotor lacks the coating.

In some implementations, the bulk material of the first brake rotor and the second brake rotor can be a same material. For example, both the first brake rotor and the second brake rotor can be formed of a same bulk material such as cast iron, stainless steel, titanium, a composite material (e.g. ceramic, carbon fiber, etc.), or the like. In other implementations, the bulk material of the first brake rotor and the second brake rotor can differ, for example such that a first bulk material of the first brake rotor includes cast iron, stainless steel, titanium, a composite material, or the like, and a second bulk material of the second brake rotor can be a different material, optionally one or more of cast iron, stainless steel, titanium, a composite material, or the like but not the same material as the first bulk material.

A multi-wheeled vehicle can be any vehicle having two or more wheels. In general, such a vehicle would have wheels mounted on two or more axles. For example, a motorcycle or other two-wheeled vehicle has a front wheel and a back wheel mounted on front and back axles. A four-wheeled car or truck can have two rear wheels on a back axle as well as two front tires, which can be on separate front axles capable of turning to change a direction of motion of the car. A larger vehicle, such as a bus, a truck, a military vehicle (e.g. a tank, a multi-axle transport vehicle, etc.), or the like can have front wheels as well as multiple back wheels, which can be mounted on multiple parallel axles.

Because the wear and corrosion resistant coatings described herein can prolong the useful life of a brake rotor, it can be advantageous to coat all of the rotors on a vehicle in this manner. However, a front brake rotor of a multi-wheeled vehicle can often receive a much greater fraction of the braking force (e.g. the "work" resulting from a transfer of kinetic energy into heat) used in stopping a vehicle. This can occur, for example, because as the braking system is actuated (e.g. as the brakes are applied), there is generally a change in the balance of weight distribution of the vehicle as the center of gravity of the vehicle rotates at least slightly forward relative to a plane of the surface on which the vehicle is traveling. This rotation generally places more of the vehicle weight on the front tires than on the rear tires. Accordingly, the front rotors of a vehicle braking system installed on a multi-wheeled vehicle generally wear more quickly. As the costs of preparing a brake rotor with a wear and corrosion resistant coating as discussed herein can be non-negligible, it can be advantageous to use brake rotors having such a coating only in the braking component combination that is operable to stop or slow rotation of a first wheel or set of wheels on the vehicle. The other brake rotors (e.g. those associated with rear tires), which are not subject to the same amount of braking wear, can be less expensive "conventional" brake rotors, thereby resulting in significant material cost savings without significantly increasing maintenance costs relative to a vehicle with coated rotors associated with all wheels.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

Other implementations may be within the scope of the following claims.

What is claimed is:

1. A braking system of a multi-wheeled vehicle, the braking system comprising:
   a first combination of braking components operable to slow or stop rotational motion of a first wheel of the multi-wheeled vehicle, the first combination comprising:
   a first brake pad comprising a friction material, and
   a first brake rotor comprising a coating that imparts wear and corrosion resistant properties to the first brake rotor, the coating comprising a first layer comprising a first material and a second layer comprising a second material, the first layer comprising a plurality of layers of the first material merged to form a single layer, the first brake rotor further comprising a friction surface having a second scale of surface topography configured to cause transfer of some of the friction material to the friction surface during braking, thereby creating a transfer film layer comprising transferred friction material, the transferred film layer being mechanically held in place on the friction surface of the brake rotor by features of the second scale of surface topography, the wear and corrosion resistant properties of the coating causing the second scale of surface topography to be durable to wear from use of the braking components in stopping the multi-wheeled vehicle.

2. A braking system as in claim 1, wherein the coating comprises graphene.

3. A braking system as in claim 1, wherein the first material comprises a metal.

4. A braking system as in claim 3, wherein the metal comprises at least one of titanium, chromium, zirconium, aluminum, and hafnium.

5. A braking system as in claim 1, wherein the second material comprises at least one of a nitride, a boride, a carbide, or an oxide of the first material.

6. A braking system as in claim 1, wherein the coating comprises multiple iterations of the first layer and the second layer.

7. A braking system as in claim 6, wherein the multiple iterations of the first layer are deposited sequentially prior to deposition of the multiple iterations of the second layer.

8. The braking system as in claim 6, wherein each of the multiple iterations of the first layer and each of the multiple iterations of the second layer have a thickness in a range of one atom to three or four thousand Angstroms.

9. A braking system as in claim 1, wherein the first brake rotor comprises a first scale of surface topography, the first scale of surface topography comprising a plurality of island formations separated by channels.

10. A braking system as in claim 1, wherein the second scale of surface topography comprises a plurality peaks and valleys of regular or irregular shape.

11. A braking system as in claim 1, wherein the friction material of the brake pad and the friction material of the transfer film layer participate in an adherent friction interaction that enhances a first braking power of the first combination of braking components.

12. A braking system as in claim 1, wherein the friction material of the first brake pad consists essentially of components other than copper.

13. A braking system as in claim 1, wherein the friction material of the first brake pad consists essentially of one or more environmentally inert components.

14. A braking system as in claim 1, further comprising a second combination of braking components operable to slow or stop rotational motion of a second wheel of the multi-wheeled vehicle, the second combination comprising a second brake rotor and a second brake pad, the second brake rotor lacking the coating.

15. A method for configuring a braking system of a multi-wheeled vehicle, the method comprising:
   installing a first combination of braking components operable to slow or stop rotational motion of a first wheel of the multi-wheeled vehicle, the first combination comprising a first brake rotor and a first brake pad, the first brake pad comprising a friction material, the first brake rotor comprising a coating that imparts wear and corrosion resistant properties to the first brake rotor, the coating comprising a first layer comprising a first material and a second layer comprising a second material, the first layer comprising a plurality of layers of the first material merged to form a single layer, the first brake rotor further comprising a friction surface having a second scale of surface topography configured to cause transfer of some of the friction material to the friction surface during braking, thereby creating a transfer film layer comprising transferred friction material, the transferred film layer being mechanically held in place on the friction surface of the brake rotor by features of the second scale of surface topography, the wear and corrosion resistant properties of the coating causing the second scale of surface topography to be durable to wear from use of the braking components in stopping the multi-wheeled vehicle.

16. A method as in claim 15, further comprising installing a second combination of braking components operable to slow or stop rotational motion of a second wheel of the multi-wheeled vehicle, the second combination comprising a second brake rotor and a second brake pad, the second brake rotor lacking the coating.

17. A method for slowing or stopping a multi-wheeled vehicle, the method comprising:
   engaging a braking system of the multi-wheeled vehicle, the braking system comprising:
      a first combination of braking components operable to slow or stop rotational motion of a first wheel of the multi-wheeled vehicle, the first combination comprising a first brake rotor and a first brake pad, the first brake pad comprising a friction material, the first brake rotor comprising a coating that imparts wear and corrosion resistant properties to the first brake rotor, the coating comprising a first layer comprising a first material and a second layer comprising a second material, the first layer comprising a plurality of layers of the first material merged to form a single layer, the first brake rotor further comprising a friction surface having a second scale of surface topography configured to cause transfer of some of the friction material to the friction surface during braking, thereby creating a transfer film layer comprising transferred friction material, the transferred film layer being mechanically held in place on the friction surface of the brake rotor by features of the second scale of surface topography, the wear and corrosion resistant properties of the coating causing the second scale of surface topography to be durable to wear from use of the braking components in stopping the multi-wheeled vehicle.

* * * * *